INVENTOR.
WALTER B. KIRK
BY
*A. A. Steinmiller*
ATTORNEY

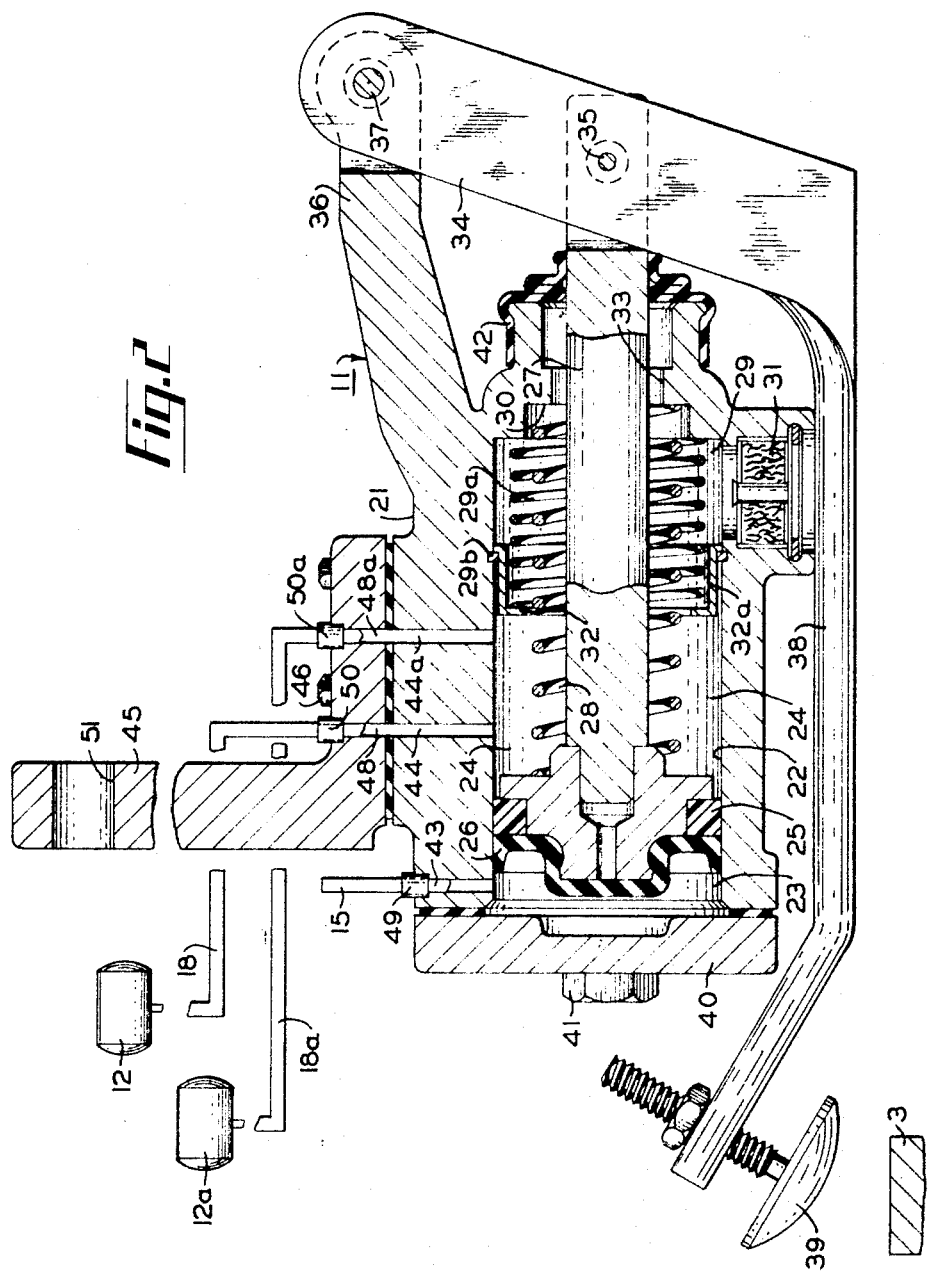

United States Patent Office 3,460,870
Patented Aug. 12, 1969

3,460,870
EMPTY AND LOAD BRAKE APPARATUS
Walter B. Kirk, Pitcairn, Pa., assignor to Westinghouse Air Brake Company, Wilmerding, Pa., a corporation of Pennsylvania
Filed Dec. 15, 1967, Ser. No. 691,037
Int. Cl. B60t 8/18, 15/02; F15b 11/08
U.S. Cl. 303—22                    3 Claims

ABSTRACT OF THE DISCLOSURE

Empty and load brake apparatus for railroad freight cars of the type having an "empty" and "load" sensing detector valve responsive to relative positions of sprung and unsprung parts of a car truck for selectively connecting one or more volume reservoirs to the brake cylinder depending on the supply pressure during service and emergency applications when the detector valve registers an "empty" condition for the car, to thereby control the equalization pressure resulting in the brake cylinder during service and emergency brake applications so as to insure the braking force being sufficiently low in each case to prevent wheel sliding.

BACKGROUND OF THE INVENTION

Figure 1:
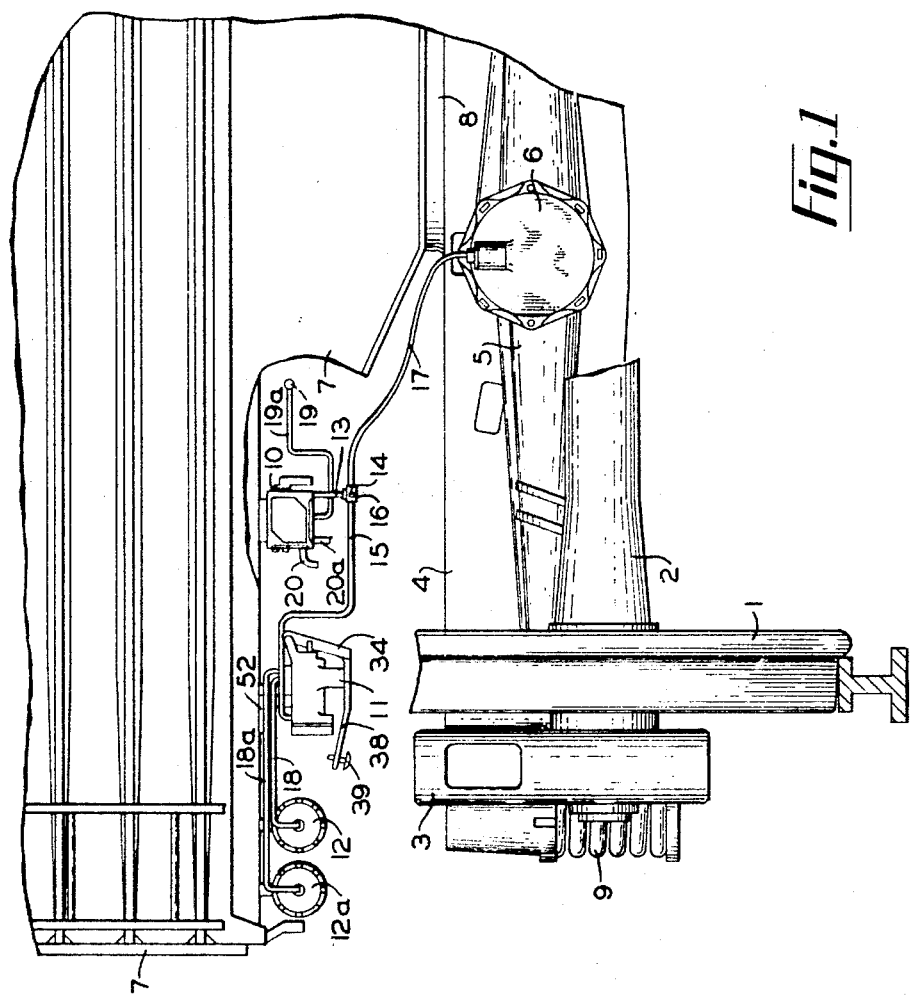

Various proposals have been made for providing empty and load brake operation for freight cars, said proposals including both mechanical and pneumatic types of apparatus utilizing strut cylinders, lever arms, detector valves, change-over valves and other linkage arrangements. A more recently developed arrangement disclosed in Patent No. 3,338,638, issued Aug. 29, 1967, to W. B. Kirk et al. and assigned to the assignee of this application, utilizes a load-sensing detector valve attached to the underside of the car body and sensitive to the distance between sprung and unsprung parts of a car truck for selectively controlling connection of the pressure chamber of each brake cylinder to, and disconnection from, a single displacement volume reservoir, depending upon the degree of load on the car.

This type of apparatus is operatively effective for all brake applications and makes no distinction between service applications and emergency applications. However, since the supply pressure in emergency applications is higher than for service applications, due to the fact that both the auxiliary and emergency reservoirs are connected via the brake control valve to the brake cylinder, it is possible that the single equalization pressure in the brake cylinder provided during the "empty" condition by the apparatus of the patent would be sufficiently high to induce wheel sliding. It is desirable, therefore, to provide means to avoid this situation and the invention has this as its primary purpose.

SUMMARY OF THE INVENTION

According to the invention, there is provided an empty and load brake apparatus for railroad freight cars of the type having an "empty" and "load" sensing detector valve responsive to relative positioning of sprung and unsprung parts of a car truck for selectively controlling the equalization pressure in the brake cylinder during both a service and an emergency application. The detector valve utilized in this apparatus includes a piston subject to brake cylinder pressure and movable in opposition to a first spring means in a cylinder thereof to operate a lever arm which measures the distance between said sprung and unsprung parts of the car and permits movement of said piston to establish communication to a first volume reservoir only during a service application under an empty condition to thereby lower the equalization pressure in said brake cylinder during said service application. During an emergency application of the brakes under the "empty" condition of the car, the piston of the detector valve is subjected to the higher pressure of fluid supplied to the brake cylinder and, in opposition to the resistance of both the first spring means and a second spring means, is thereby shifted to establish communication between the brake cylinder and both said first volume reservoir and a second volume reservoir; the resulting equalization pressure so limiting brake cylinder pressure as to prevent wheel sliding.

In the accompanying drawings:
FIG. 1 is a fragmental elevational end view of a freight car, showing one embodiment of the invention.
FIG. 2 is an enlarged fragmental vertical sectional view, of the detector valve showing details of the embodiment shown in FIG. 1.

DESCRIPTION

Referring to FIG. 1 of the drawings there is shown a fragmental and elevational view of a freight car, including a wheel 1 and axle 2 on a car truck having a side frame 3 and a bolster 4. A foundation brake rigging is carried on the car truck and includes a pair of brake beams 5 (one of which is shown), on each of which a brake cylinder 6 is carried. Part of the car body 7 is shown as conventionally supported on the bolster 4 at a center bearing 8. Car springs 9 support the opposite ends of the bolster 4 on side frames 3, only one of which is shown.

Suitably mounted on the underside of the car body 7 are the conventional brake controlling device 10 of the AB type, a detector valve 11, and a plurality of displacement reservoirs 12 and 12a. The brake controlling device 10 is connected by the pipe 13 to the brake cylinder pipe 14 (of which only the end is shown) extending lengthwise along the car such that each brake cylinder on the car may be connected thereto, as explained hereinafter. A pipe 15 is connected from the detector valve 11 to the brake cylinder pipe 14 at a fitting 16, and a flexible pipe 17 connects each brake cylinder 6 (only one of which is shown in FIG. 1) to the brake cylinder pipe 14. The detector valve 11 is connected to a pair of displacement reservoirs 12 and 12a by pipes 18 and 18a respectively. A conventional brake pipe 19 extends the length of the car and is connected to the brake controlling device 10 by a branch pipe 19a. Other pipes 20 and 20a lead from the brake controlling device 10 to the usual auxiliary reservoir and emergency reservoir (not shown).

Referring to FIG. 2, the detector valve 11 comprises a valve body 21 having a cylinder bore 22 therewithin, forming a pressure chamber 23 and a non-pressure chamber 24 on the opposite sides of a piston 25 which is slidable within said cylinder bore. The piston 25 carries a packing cup and is subject on the packing cup side to fluid pressure in the pressure chamber 23 and on the opposite side to the force of a coil spring 28 encircling an attached piston stem 27. The piston stem 27 extends through the non-pressure chamber 24 and a spring chamber 29 in which the coil spring 28 and a caged spring 29a are housed, to a spring seat 30. The spring chamber 29 is connected to atmosphere by way of a filter 31 in a vent hole in the valve body 21. A piston stop 29b in the form of an annular ring is inserted in the inner surface of the cylinder bore 22 between the non-pressure chamber 24 and the spring chamber 29, limits the travel of the piston 25 and a spring cage as will be explained. Constant communication is maintained between said non-pressure chamber 24 and the spring chamber 29 to atmosphere via a central hole 32 in the radial flange of spring cage 32a for the caged spring 29a and thence via the filter 31 to atmosphere.

The piston stem 27 extends from the piston 25 through the non-pressure chamber 24, through the hole 32 in the flange of the spring cage 32a and thence through the coil spring 28 and caged spring 29a in the chamber 29, and through an opening 33 in the wall of valve body 21 at the spring seat to its outer end where it has a slot in the end which receives a lever 34 to which it is pivotally connected, as by a pin 35. The lever 34 is pivotally secured in a slot in an extension arm 36 on the top of the valve body 21, as by a pin 37 or a bolt, in a manner such that any movement of the piston 35 is transmitted to the lever 34 via the piston stem 27. The lever arm 38 extends approximately perpendicular to the lever 34 at the outer end thereof in a manner to pass under the valve body 1 and then tilts slightly upward with an adjustable screw stop 39 screwed into the outer end of the lever arm 38.

An end plate 40 is secured to one end of the valve body 21, as by bolts 41 to form one end of the pressure chamber 23, while a dust or dirt excluding sleeve or boot 42 encircling the piston stem 27 is frictionally slipped over a cylindrical protrusion on the opposite end of the valve body 21.

A plurality of passages 43, 44 and 44a in the valve body 21 lead respectively from the pressure chamber 23, and the non-pressure chamber 24 in two different locations, to the outside of the valve body. An L-shaped supporting bracket 45 is sealingly secured to the top of the valve body 21, as by screws 46 and has two passages 48 and 48a therethrough in alignment with the passages 44 and 44a. Pipe fittings 49, 50 and 50a are fitted into the threaded passages 43, 48 and 48a to receive pipes 15, 18 and 18a (FIG. 1), respectively. The bracket 45 is provided with holes 51 through which suitable bolts extend to secure the valve body 21 to a mounting bracket 52 (FIG. 1) on the underside of the car.

The detector valve 11 is located on the underside of the car at a position where the adjustable stop 39 on the lever 38 will engage the top edge of the side frame 3 during a brake application under load conditions, as explained hereinafter. The detector valve 11 is positioned above the top edge of the side frame 3 at a distance sufficient, when the car is empty, to permit the lever arm 38 to move its entire swing (responsively to a brake application) without the adjustable stop 39 thereon contacting the side frame 3.

It should be understood that the bolster 4 is supported by the coil springs 9 on the "unsprung" truck side frame 3 in a usual well-known manner, such that the bolster 4 and the car body 7 riding on the center bearing 8 thereof will be biased downwardly toward the tracks with the compression of the coil springs 9 when the car is loaded. With downward movement of the car body 7, the detector valve 11 will be moved downwardly toward the side frame 3, reducing the clearance therebetween such that movement of the adjustable stop 39 on the lever arm 38 will be limited by engaging the side frame 3 during a brake application to thereby correspondingly alter the effective braking force, in a manner described hereinafter. Due to the reduced clearance between the detector valve 11 and the side frame 3 under "load" condition, the lever arm 38 is constructed with sufficient degree of resiliency to flex and provide a cushioning effect to prevent bending thereof should the lever arm 38 accidentally engage the side frame 3 due to undesired bouncing of the car. During brake application, the fluid under pressure in the pressure chamber 23 also adds a slight degree of cushioning effect to the lever arm 38 during any undesired bouncing of the car.

When it is desired to effect a brake application, the brake controlling device 10 is operated, by reduction of fluid under pressure in the brake pipe 19 in a conventional manner, to cause fluid under pressure to be supplied from the auxiliary reservoir pipe 20 to the brake cylinder pipe 14 and thence by flexible pipe 17 to each brake cylinder 6 on the car. Simultaneously, with the supply of fluid under pressure from the brake cylinder pipe 14 to the brake cylinder 6, fluid under pressure is supplied via pipe 15 and passage 43 to the pressure chamber 23 of the detector valve 11.

The supply of fluid under pressure to the brake cylinders 6 causes the pistons and piston push rods thereof (not shown) to move the brake beams and the brake shoes (not shown) into a brake application position, engaging the tread of the wheels 1 in the usual well-known manner.

With the car in "empty" or lightly loaded condition, the detector valve 11 is vertically positioned a substantial distance above the side frame 3, as shown in FIG. 1.

As fluid under pressure is supplied to the pressure chamber 23 of the detector valve during a service brake application as before described, the resistance of the coil spring 28 prevents movement of the piston 25 until approximately ten pounds pressure is obtained therein to overcome the force of coil spring 28 and initiate movement of the piston 25 to the right (as viewed in the drawings) within the non-pressure chamber 24 until a pressure of approximately thirty-five pounds is attained at which occurrence the passage 44 is uncovered, that is, passed by the piston 25 and connecting the pressure chamber 23 thereto. It will be understood that this rightward movement of the piston 25 a distance sufficient to uncover only the passage 44 is done at a condition only when the fluid pressure in the pressure chamber 23 is above ten pounds and within the limits of a full service application pressure, and is permitted only because the car is empty, and a detector valve 11 is therefore sufficiently high enough above the side frame 3 to allow the lever arm 38 of the lever 34 to pivotally swing downward freely with the rightward movement of the piston 25 and the piston stem 27, without engagement by the adjustable stop 39 with the top edge of the side frame 3.

When the passage 44 is uncovered as described, fluid under pressure in the pressure chamber 23 is permitted to flow via passage 44, passage 48 and pipe 18 to the first displacement reservoir 12, thereby communicating the additional volume of the first displacement reservoir 12 to the volume of the brake cylinder pressure chambers (not shown). Thus, resultant equalization pressure obtained for a given service reduction of brake pipe pressure and corresponding operation of the brake controlling valve device is lower with the addition of the first displacement reservoir volume than it is for the brake cylinder pressure chamber (not shown) only. As the fluid under pressure in the pressure chamber 23 is supplied to the first displacement reservoir 12, a pressure equalization therebetween occurs. If the pressure equalization occurs at a pressure less than the opposing force of the coil spring 28, the coil spring 28 will cause the piston 25 to be moved back to the left a small amount to close passage 44 in lap position and thereby limit the fluid pressure effective in the connected brake cylinder to the approximate pressure of thirty-five pounds for safely braking an empty car in a service brake application without danger of wheel sliding.

If the pressure equalization occurs at a pressure greater than the ten pound pressure, up to a pressure approximately thirty-five to forty pounds the piston 25 may come in contact with the flange of spring cage 32a and thereby be prevented from further movement. Thus, the communication between the pressure chamber 23 and a first displacement reservoir 12 will be maintained open during the service brake application.

If the brake application is an emergency application, the fluid under pressure supplied to the pressure chamber 23 of the detector valve during such emergency brake application is greater than the predetermined thirty-five to forty pounds pressure and is therefore sufficient to overcome not only the force of spring 28, but also overcome the additional opposing force of the caged spring 29a to thereby move the piston 25 its entire length up to and engaging the piston stop 29b to thereby uncover the passage 44a in the valve body 21. It will be understood that this rightward movement of the piston 25 the entire length of the non-pressure chamber 24 is permitted because the car is empty, and the detector valve 11 therefore positioned sufficiently high enough above the side frame 3 to allow the lever arm 38 of the lever 34 to pivotally swing downward freely with a rightward movement of the piston 25 and the piston stem 27, without engagement by the adjustable stop 39 with the top edge of the side frame 3. When the passages 44 and 44a are uncovered as described, the fluid under pressure in the pressure chamber 23 is permitted to flow via passages 44 and 44a to both the displacement reservoirs 12 and 12a thereby communicating the additional volume of the displacement reservoirs 12 and 12a to the volume of the brake cylinder pressure chambers (not shown). Thus the resultant equalization pressure obtained for the emergency reduction of brake pipe pressure and corresponding operation of the brake controlling valve device 10 is lower with the addition of the two displacement reservoir volumes than it is for the brake cylinder pressure chamber only. As a pressure equalization during the emergency brake application occurs at a pressure greater than the predetermined pressure between thirty-five and forty pounds, communication between the pressure chamber 23 and the displacement reservoirs 12 and 12a will be maintained open to thereby effect the emergency brake application at a pressure sufficient to effect an emergency brake application of the train in this "empty" condition without danger of wheel sliding.

When the brakes are released either after service brake application or emergency brake application the brake cylinders and connected pressure chamber 23 are vented by the brake controlling valve device 10 in the well-known manner, thereby causing the piston 25 to shift all the way to the left in the pressure chamber 23 (as shown) under the biasing force of both the caged spring 29a and the coil spring 28 after emergency application or just the coil spring 28 after service application. As the piston 25 is moved to the left the passages 44a and 44 are first closed from communication with the pressure chamber 23 and then uncovered and opened to communication with the non-pressure chamber 24 to cause venting of the displacement reservoir 12a and then 12 to atmosphere via the non-pressure chamber 24, spring chamber 29 and the filter 31.

As previously described, when the car is in a "load" condition, the weight of the load will be sufficient to move the car body downwardly toward the side frame 3 as the coil springs 9 are compressed. This downward movement of the car body moves the detector valve 11 sufficiently near to the top of the side frame 3 that only limited movement of the lever arm 38 occurs before the adjustable stop 39 engages the side frame 3.

When a brake application, either service or emergency, is effected under the "load" condition, the operation is similar to that described when the car is empty, with the exception that in this case a supply of fluid under pressure to the pressure chamber 23 of the detector valve 11 will move the piston 25 and the piston stem 27 to the right only a small distance, a distance insufficient to uncover either passage 44 or 44a, due to the fact that the lever arm 38 of the connected lever 34 is limited in its downward pivotal movement by engagement of the adjustable stop 39 with the top edge of the side frame 3. Engagement of the adjustable stop 39 with the side frame 3 prevents the increasing of the volume of the brake cylinder pressure chamber (not shown) by venting to the displacement reservoirs 12 or 12a, as previously explained, due to the fact that the piston 25 cannot be moved far enough to uncover either passage 44 or 44a leading to the respective displacement reservoirs 12 and 12a. Accordingly, without the additional volume, equalization pressure in the brake cylinders for a given brake pipe pressure reduction and corresponding operation of the brake controlling valve device 10 is correspondingly higher, such that a higher degree of braking is obtained when the car is under "load" condition, as desired.

It should be noted that equalization pressure in a brake cylinder for a service application in an "empty" condition can be varied by variation in the size of the displacement volume 12. Similarly, equalization pressure in an emergency brake application can be varied by variation in the size of the displacement volume 12a. It should also be noted that variation in the change-over from "empty" to "load" braking may be effected by adjusting the adjustable stop 39 such that it engages the side frame 3 with either a lesser or greater degree of movement of the lever arm 38, as desired.

The use of the lever 34 and the lever arm 38 with the adjustable stop 39 permits use of a relatively small pressure chamber 23 and, therefore, a relatively small detector valve 11.

It will be understood that while the invention has been described particularly for use in connection with the new design of truck mounted brake rigging, it is not limited to such use as it will be apparent that the invention is readily adapted for use in connection with the existing conventional freight car body mounted brake rigging including a single car body mounted brake cylinder with suitable location of the detector valve between a "sprung" and "unsprung" part of the car truck.

Having now described the invention, what I claim as new and desire to secure by Letters Patent, is:

1. Empty and load brake apparatus for a railway vehicle, said apparatus comprising, in combination:
   (a) a brake cylinder effective to cause a service brake application upon pressurization up to a certain pressure and an emergency brake application upon pressurization above said certain pressure,
   (b) a plurality of volume reservoirs, and
   (c) load-sensing means operative according to the relation of sprung and unsprung portions of the vehicle for communicating one of said reservoirs with the brake cylinder incidental to a service brake application when the load is less than a certain fraction of full load, and for communicating all of said reservoirs with said brake cylinder incidental to an emergency application when the load is less than said certain fraction of full load, said load-sensing means comprising:
      (i) a cylinder,
      (ii) a piston operative in said cylinder and having at one side a pressure chamber and at the opposite side a chamber at atmospheric pressure, said pressure chamber being in constant communication with said brake cylinder,
      (iii) a pair of coaxially related springs, one of which yieldingly opposes travel of the piston toward said atmospheric chamber upon pressurization of the pressure chamber with said brake cylinder, and the other of which yieldingly opposes travel of the piston toward said atmospheric chamber beyond an initial zone of travel, and
      (iv) a plurality of port means in said cylinder via which said volume reservoirs are respectively connected to said atmospheric chamber during non-pressurization of the brake cylinder, and connected to said pressure chamber under the control of said piston as it travels toward the said atmospheric chamber,
      (v) one of said reservoirs being connected to the pressure chamber whenever the said piston travels beyond a certain point in said initial zone responsive to pressurization of said pressure chamber and the other of said reservoirs being connected to said pressure chamber whenever the piston travels a certain amount beyond said initial zone responsive to pressurization of said pressure chamber above said certain pressure.

2. Empty and load brake apparatus, as claimed in claim 1, wherein said load-sensing means further comprises lever means movable by travel of said piston toward said atmospheric chamber for preventing travel of the piston sufficiently toward the atmospheric chamber to establish communication between any of said volume reservoirs and the pressure chamber so long as the load on the vehicle exceeds a certain fraction of full load.

3. Empty and load brake control apparatus for use on a railway car of the type having the car body supported in resilient sprung relationship to the unsprung portion of the car, said apparatus comprising:
  (a) a brake cylinder effective to selectively cause a service or an emergency brake application according to the degree of pressurization thereof,
  (b) detector valve means carried by the car body, and having a pneumatic communication to said brake cylinder, and
  (c) a pair of displacement reservoirs having individual pneumatic communications to said detector valve means,
  (d) said detector valve means comprising:
    (i) a cylinder,
    (ii) a piston valve means, operable in said cylinder, having a pressure chamber at one side subject to pressure established in the brake cylinder, and a second chamber on the side of said piston valve means opposite to said pressure chamber, which second chamber is constantly vented to atmosphere and connected to both of said displacement reservoirs during a non-pressurized condition of the brake cylinder, and connected to only one of said displacement reservoirs during a service brake application under an empty car condition and disconnected from both said displacement reservoirs during an emergency brake application under an empty car condition,
    (iii) a first biasing means opposing movement of the piston valve means by the fluid pressure in said pressure chamber during a brake application,
    (iv) a second biasing means additionally effective to oppose movement of the piston valve means responsive to fluid pressure in said pressure chamber only during an emergency application, and
    (v) lever means actuated by the piston valve means from a retracted to a first extended position responsively to fluid pressure exceeding a first certain value during a service brake application sufficient to overcome the force of the first biasing means under an empty car condition, and actuated by the piston valve means from said retracted to a second extended position responsively to fluid pressure exceeding a second certain value sufficient to overcome the force of said first and second biasing means during an emergency application under an empty car condition,
    (vi) said lever means engaging the unsprung part of the car to block operation of the piston valve means when the load on the car exceeds a certain fraction of full load, responsive to supply of fluid under pressure to the brake cylinder, and being free to move to said first and second extended positions without engaging the unsprung part of the car, responsively to supply of fluid under pressure to the brake cylinder only when the load on the car is less than said certain fraction of full load,
    (vii) said piston valve means being operative to disconnect said first displacement reservoir from said second chamber and establish communication between said first displacement reservoir and said pressure chamber in said cylinder of said detector valve means only when said lever means is in its first extended position, and being operative to disconnect said first displacement reservoir and said second displacement reservoir from said second chamber and establish communication between said first and second displacement reservoirs and said pressure chamber in said cylinder of said detector valve means only when said lever means is in its second extended position, and being non-operative to establish communication between either the first or second displacement reservoirs and the said pressure chamber when the lever is blocked against movement to its first or second extended position respectively.

References Cited

UNITED STATES PATENTS 3,338,638   8/1967   Kirk et al. _____ 303—22

MILTON BUCHLER, Primary Examiner

JOHN J. McLAUGHLIN, Jr., Assistant Examiner

U.S. Cl. X.R.

91—422; 137—38; 303—68